No. 768,426. Patented August 23, 1904.

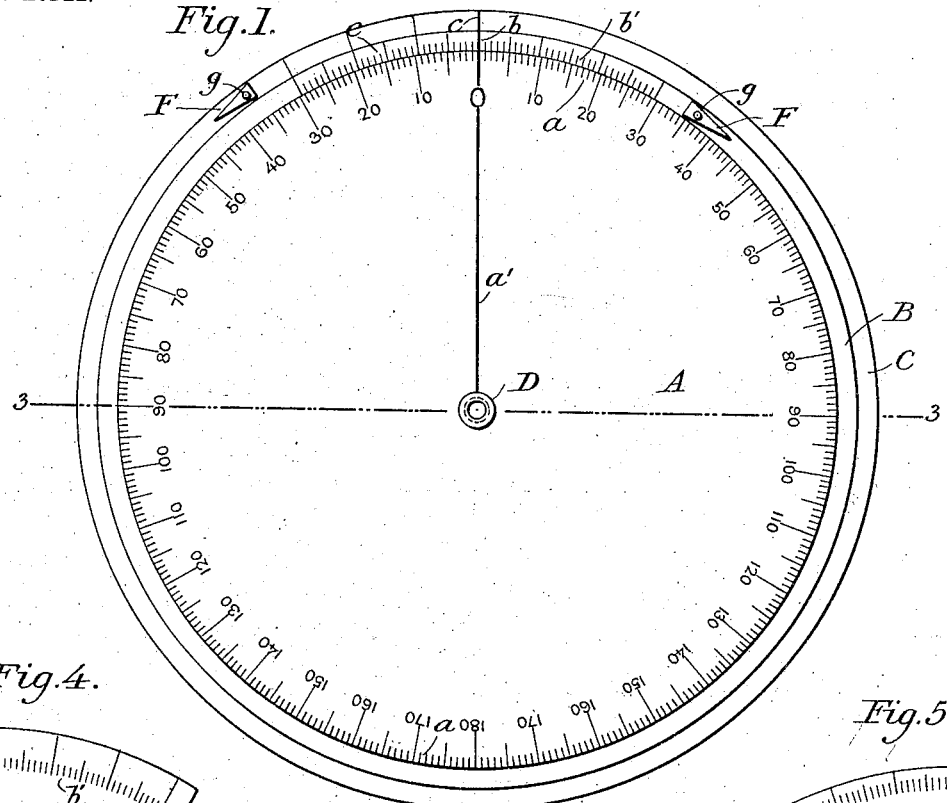
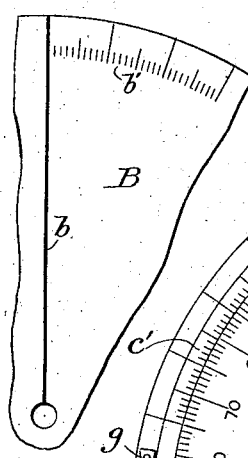
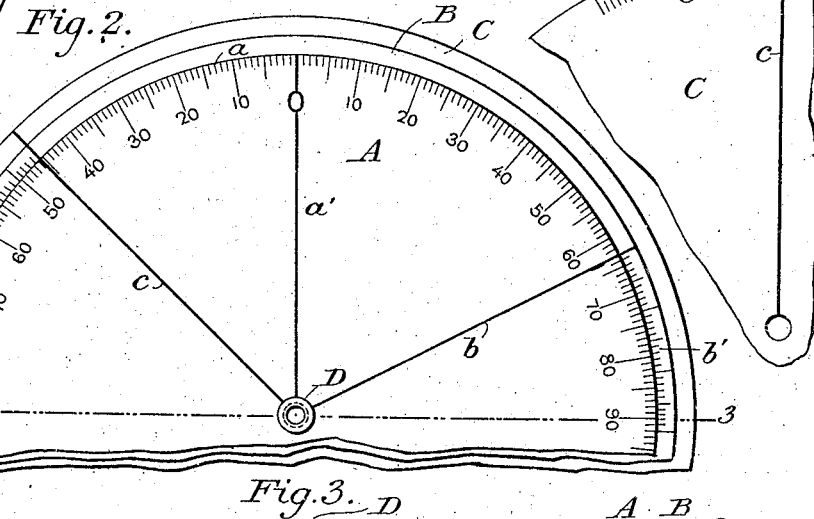
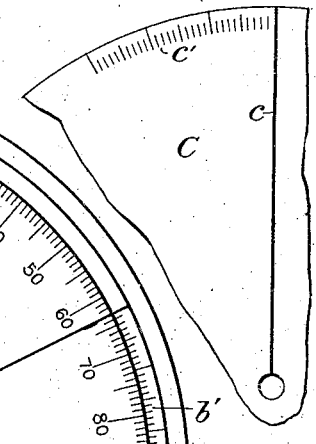
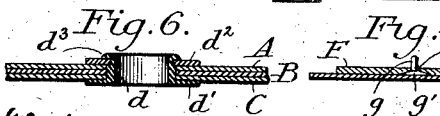

UNITED STATES PATENT OFFICE.

EMIL E. COURT, OF WASHINGTON, DISTRICT OF COLUMBIA.

PROTRACTOR.

SPECIFICATION forming part of Letters Patent No. 768,426, dated August 23, 1904.

Application filed April 4, 1903. Renewed July 13, 1904. Serial No. 216,433. (No model.)

*To all whom it may concern:*

Be it known that I, EMIL E. COURT, a citizen of the United States, residing at Washington, in the District of Columbia, have invented certain new and useful Improvements in Protractors, of which the following is a specification.

My invention relates to improvements in protractors for use in plotting angles and bearings relating to navigation, surveying, map and chart construction, and similar work, and is especially adapted for use in the laying down of the three-point problem for the location of an object in general use in hydrographic and other surveys.

The three-arm protractors in general use for the purposes named are expensive, heavy, difficult of management where quick and accurate work is required, obscure a portion of the drawing when in use, and are entirely too cumbersome to be used in an ordinary field or camping outfit.

This invention has for its object the production of an inexpensive, light, simple, and accurate substitute for the ordinary three-arm protractor which is capable of use for similar purposes, does not obscure the drawing upon which it rests when in use, is readily portable, and is adapted to field use.

With these objects in view the invention consists in a protractor composed of three circular disks of flexible transparent material, preferably zylonite, celluloid, or a similar substance, adapted to revolve about a central pivotal point, one of the disks being divided circumferentially to degrees or half-degrees and provided with a radial line running through the zero of such degree-scale and the other disks provided, respectively, with a similar radial line and a vernier adapted to read upon the scale of the first-named disk, one to the right of its radial line and the other to the left of the same.

Referring to the drawings accompanying this specification, Figure 1 is a plan view of a protractor constructed in accordance with my invention with the disks turned to zero of the scale. Fig. 2 is a similar view with the disks in position to indicate the right and left angles of a three-point location. Fig. 3 is a central longitudinal section on the line 3 3 of Figs. 1 and 2. Fig. 4 is a detail view of the second disk, showing the arrangement of the vernier thereon with relation to the radial line. Fig. 5 is a similar view of the third disk. Fig. 6 is a detail showing a preferred method of pivoting the disks, and Fig. 7 is a detail showing a device applied to the edge of the disks to facilitate and direct their relative movement.

In the drawings, A, B, and C are disks, preferably made of zylonite, celluloid, or similar flexible transparent material, mounted to revolve independently about a common center D, provided with a central opening through which a point may be plotted on an underlying surface. The upper disk A is circumferentially divided to degrees or where more accurate work is desired to half-degrees, the resulting scale $a$ being numbered to the right and left of the zero-point from one to one hundred and eighty degrees in the usual manner and provided with a radial line $a'$, running from the center of the disk through the zero-point of the scale $a$.

The disk B (see Fig. 3) underlying the disk A is of slightly-larger diameter and is provided with a radial line $b$, running from the center to the edge of the disk, and with a vernier $b'$, placed to the right hand of such radial line and adapted to read against the circumferential scale $a$ of the disk A in such manner as to divide the degrees indicated thereon into minutes or fractions thereof.

The disk C (see Fig. 4) underlying disks A and B is of slightly-larger diameter than disk B and is provided with a radial line $c$, running from the center to the edge of the disk, and with a vernier $c'$ of similar construction and operation to that on disk B, but placed to read to the left hand of the radial line C'.

The center D, upon which the disks revolve and by which they are held together, may be of any construction by which an accurate relation of the parts can be maintained and which will permit a central point to be plotted; but the preferred construction is illustrated in Fig. 6 of the drawings. As shown in this figure, the center D consists of a thimble or ring $d$, about which the disks revolve, provided with an annular flange $d'$, underlying the disks, and with an annular washer $d^2$, mounted upon the thimble above the disks and resting upon a slight shoulder formed upon the thimble $d$, upon which the ring is secured by expanding the upper end of the thimble, as indicated at $d^3$.

The method of using the protractor is shown in Fig. 2, in which figure the device is set to lay down a location from three points with an angle to the right of the central object of sixty-three degrees and an angle to the left of the central object of forty-five degrees and thirty minutes.

As the sheets of which the disks are composed are very flexible, the disks can be readily handled and moved in relation to each other while the protractor is in use by elevating or bending the edges of the disks. In order, however, to facilitate its use and indicate the direction, the disks B and C may be provided with the device shown in Fig. 7, consisting of a pointer F, with its head indicating the direction in which the disk to which it is applied should be turned secured to the disk by cementing or riveting, and provided with an opening $f$, through which a small knob $g$, carried by a plate $g'$, held between the pointer F and the disk, is projected, the knob $g$ furnishing a ready means for turning the disks around their center.

It is obvious that the protractor above described may be modified in many ways as regards arrangement and detail without materially departing from the invention. For instance, the second and third disks can be replaced by sections or arms carrying the vernier and radial line, and other modifications will naturally occur to the skilled mechanic which are more or less obvious variations.

What I claim as new, and desire to secure by Letters Patent, is—

1. A three-arm protractor composed of thin disks of transparent material independently revoluble about a common center, a degree-scale carried by one of said disks, and a vernier carried by each of the other disks adapted to read one to the right and one to the left upon said degree-scale.

2. A three-arm protractor composed of three disks of transparent flexible material, independently revoluble about a common center, a degree-scale carried by the first of said disks, a radial inscribed upon said disk passing through the zero of said scale, a radial inscribed upon the second disk, a vernier reading to the right of said radial carried by said second disk, and a radial inscribed upon the third disk, with a vernier reading to the left of said radial, substantially as described.

3. A three-arm protractor composed of three disks of transparent flexible material, independently revoluble about a common center, a degree-scale carried by the first of said disks, a radial inscribed upon said disk passing through the zero of said scale, a radial inscribed upon the second disk, a vernier reading to the right of said radial carried by said second disk, a radial inscribed upon the third disk, a vernier reading to the left of said radial carried by the third disk, and an opening in the common center through which a point may be plotted, substantially as described.

4. In a protractor, the combination with a transparent flexible disk provided with a circumferential scale reading degrees, and a radial line passing through the zero of said scale, of a similar disk underlying the first provided with a radial line and a vernier adapted to read to the right upon said circumferential scale, a third similar disk underlying the first two provided with a radial line and a vernier adapted to read to the left upon said circumferential scale, and an annular center upon which said disks may be independently revolved, provided with a central opening, as and for the purpose described.

5. In a protractor of the kind described, the combination with a transparent flexible disk provided with a circumferential scale reading degrees and a radial line passing through the zero of said scale, of a similar disk underlying the first provided with a radial line and a vernier adapted to read to the right upon said circumferential scale, a third similar disk underlying the first two provided with a radial line and a vernier adapted to read to the left upon said circumferential scale, an annular center upon which said disks may be independently revolved provided with a central opening and pointers provided with projections whereby the relative movement of the parts is facilitated, substantially as described.

In testimony whereof I have affixed my signature in presence of two witnesses.

EMIL E. COURT.

Witnesses:
J. M. RYAN,
RAYMOND F. BARNES.